United States Patent [19]

Mooradian

[11] Patent Number: 5,256,164
[45] Date of Patent: Oct. 26, 1993

[54] METHOD OF FABRICATING A MICROCHIP LASER

[75] Inventor: Aram Mooradian, Winchester, Mass.

[73] Assignee: Massachusetts Institute of Technology, Cambridge, Mass.

[21] Appl. No.: 999,577

[22] Filed: Dec. 30, 1992

Related U.S. Application Data

[60] Continuation of Ser. No. 512,981, Apr. 23, 1990, abandoned, which is a division of Ser. No. 308,251, Feb. 9, 1989, Pat. No. 4,953,166, which is a continuation-in-part of Ser. No. 151,396, Feb. 2, 1988, Pat. No. 4,860,304.

[51] Int. Cl.$^5$ ............................................. H01L 21/20
[52] U.S. Cl. ................... 29/25.02; 437/129; 372/32; 372/99
[58] Field of Search .................. 29/25.02; 372/26–28, 372/32, 92, 99; 437/129

[56] References Cited

U.S. PATENT DOCUMENTS

| | | | |
|---|---|---|---|
| 4,002,725 | 1/1977 | Bridenbough et al. | 423/263 |
| 4,147,409 | 4/1979 | Apfel | 350/164 |
| 4,509,175 | 4/1985 | Daly et al. | 372/101 |
| 4,556,980 | 12/1985 | Smith et al. | 371/28 |
| 4,687,331 | 8/1987 | Holz et al. | 372/32 |
| 4,730,335 | 3/1988 | Clark et al. | 372/98 |
| 4,734,912 | 3/1988 | Scerbak et al. | 372/27 |
| 4,739,507 | 4/1988 | Byer et al. | 372/22 |
| 4,797,893 | 1/1989 | Dixon | 372/66 |
| 4,809,291 | 2/1989 | Byer et al. | 372/25 |
| 4,860,304 | 8/1989 | Mooradian | 372/92 |
| 4,872,177 | 10/1989 | Baer et al. | 372/75 |
| 4,884,277 | 11/1989 | Anthon et al. | 372/22 |

FOREIGN PATENT DOCUMENTS 61-102081 10/1984 Japan.
PCT/US90/-
00644 2/1990 PCT Int'l Appl..

OTHER PUBLICATIONS

Smith "Stabilized, Single-Frequency output from a long laser cavity", IEEE, Journal of Quantum Electronics, vol. QE-1, No. 8 Nov. 1965, pp. 343-348.

Castleberry, et al., "A Single Mode 2.06 Um Miniature Laser", Digest of Technical Papers, Jan. 21-24, 1974, MB7, pp. 1-4.

Saruwatari, et al., "Electroluminescent Diode Pumped Miniaturized LiNd P$_4$O$_{12}$ Lasers", Review of the Electrical Communication Laboratories, vol. 26, Nos. 9–10, Sep.–Oct., 1978, pp. 1111-1128.

Owyoung et al., "Stress-induced tuning of a diode-laser-excited monolithic Nd:YAG laser", Optics Letters, vol. 12, No. 12, Dec. 1987, pp. 999-1001.

Zhou et al., "EG351 efficient, frequency-stable laser-diode-pumped Nd:YAG laser", Optics Letters, vol. 10, No. 2, Feb. 1985, pp. 62-64.

List continued on next page.)

*Primary Examiner*—Olik Chaudhuri
*Assistant Examiner*—Ramamohan Rao Paladugu
*Attorney, Agent, or Firm*—Hamilton, Brook, Smith & Reynolds

[57] ABSTRACT

A gain medium is disposed between two mirrors to form a resonant cavity. The cavity length is selected so that the gain bandwidth of the gain medium is less than or substantially equal to the frequency separation of the cavity modes and such that a cavity mode frequency falls within the gain bandwidth. A nonlinear optical material is disposed either inside or outside the cavity to generate new laser wavelengths. The nonlinear optical material may be contained in a cavity which is resonant at the microchip laser frequency. Alternatively, the microchip laser may be tuned, for example thermally or by the application of a longitudinal or transverse stress, to the frequency of the resonant cavity. The laser is optically pumped by any appropriate source such as a semiconductor injection laser or laser array. Suitable gain media include Nd:YAG, Nd:GSGG and Nd pentaphosphate, and suitable non-linear optical material include MqO:LiNbO$_3$ and KTP.

33 Claims, 6 Drawing Sheets

OTHER PUBLICATIONS

Kubodera et al., "Pure single-mode LiNdP4O12 solid-state laser transmitter for 1.3 μm fiber-optic communications", Applied Optics, vol. 21, No. 19, pp. 3466–3469 (date unknown).

Kubodera et al., "Efficient LiNdP4O12 lasers pumped with a laser diode", Applied Optics, vol. 18, No. 23, Dec. 1979, pp. 3882–3883.

Winzer et al., "Laser Emission from Miniaturized NdAl3(BO3)4 Crystals with Directly Applied Mirrors", IEEE, 1978, pp. 840–843.

Winzer et al., "Laser Emission from Polished NdP5O14 Crystals with Directly Applied Mirrors", Applied Physics, 11-121-130 (1976).

Owyoung et al., "Gain switching of a monolithic single-frequency laser-diode-excited Nd:YAG laser", Optics Letters, vol. 10, No. 10, Oct. 1985, pp. 484–486.

Stone et al., "Self-Contained LED-Pumped Single-Crystal Nd:YAG Fiber Laser", Fiber and Integrated Optics, vol. 2, No. 1, 1979, pp. 19–46.

Kane, Thomas J. et al., "Frequency stability and offset locking of a laser-diode-pumped Nd:YAG monolithic nonplanar ring oscillator" Optics Letters, 12, pp. 175–177 (1987).

METHOD OF FABRICATING A MICROCHIP LASER

The Government has rights in this invention pursuant to contract Number F19628-85-C-0002 awarded by the Department of the Air Force.

This is a continuation of co-pending application Ser. No. 07/512,981 filed on Apr. 23, 1990 now abandoned, which is a divisional of Ser. No. 308,251, filed Feb. 9, 1989, now U.S. Pat. No. 4,953,166 which is a continuation-in-part of Ser. No. 151,396, filed Feb. 2, 1988, now U.S. Pat. No. 4,860,304.

BACKGROUND OF THE INVENTION

This application is a continuation-in-part of U.S. Ser. No. 151,396 filed Feb. 2, 1988.

This invention relates to single frequency microchip lasers.

In this specification, numbers in brackets refer to the references listed at the end of the specification, the teachings of which are incorporated herein by reference. The realization of practical single-frequency, diode-pumped, solid-state lasers has been the goal of several researchers over the past 20 years [1]. One approach has been the solid-state, unidirectional, nonplanar, ring oscillator [2]. While this approach provides the desired laser characteristics, it suffers from a complicated fabrication process and optical alignment is critical. A simpler approach is the miniature, linear, solid-state cavity [3-5]. Although there has been some work on multimode miniature flat-flat cavities [6], the most common design for single-mode miniature cavities uses one curved mirror to stabilize the resonator [3-5]. In allowed U.S. patent application Ser. No. 151,396, filed Feb. 2, 1988 now U.S. Pat. No. 4,86 issued Aug. 22, 1989, there is disclosed a solid-state, optically pumped microchip laser in which the cavity length is selected so that the gain bandwidth of the gain medium is less than the frequency separation of the cavity modes. This relationship guarantees that only a single longitudinal mode will oscillate when the frequency of this mode falls within the laser gain region.

SUMMARY OF THE INVENTION

The solid-state, optically pumped microchip laser according to one aspect of the invention includes a solid-state gain medium disposed between two mirrors, the distance between the mirrors selected so that the gain bandwidth of the gain medium is substantially equal to the frequency separation of the cavity modes. In another aspect, a solid-state gain medium is disposed between two mirrors, the distance between the mirrors selected so that the gain bandwidth of the gain medium is less than or substantially equal to the frequency separation of the cavity modes. A nonlinear optical material is disposed to receive light from the gain medium, the nonlinear optical material selected to generate second or higher harmonics of the light from the gain medium.

In yet another aspect of the invention, the microchip laser includes a solid-state gain medium/nonlinear optical material combination disposed between two mirrors, the distance between the mirrors selected so that the gain bandwidth of the gain medium is less than or substantially equal to the frequency separation of the cavity modes. The nonlinear optical material is selected to generate second or higher harmonics of the light from the gain medium.

By selecting the cavity length so that the gain bandwidth is substantially equal to the frequency separation of the cavity modes, one is guaranteed that only one cavity frequency falls within the laser gain region and only one laser frequency will oscillate. The inclusion of nonlinear optical material provides light in the visible or ultraviolet regions useful for read and write optical disks and for projection television applications, among others. Both the laser gain element and the nonlinear crystal are dielectrically coated flat wafers. These wafers are bonded together with transparent optical cement and diced into many small sections which greatly reduces the cost and complexity of such lasers as compared with devices using discreet optical components that are fabricated and assembled separately.

The single frequency microchip lasers according to the invention employ a miniature, monolithic, flat-flat, solid-state cavity whose mode spacing is greater that the medium gain bandwidth. These lasers rely on gain-guiding or nonlinear optical effects to define the transverse dimensions of the lasing mode. As a result of the monolithic, flat-flat construction, the fabrication process for the microchip laser lends itself to mass production. The cost per laser is extremely low because of the small amount of material used for each laser and the simple fabrication. The resulting microchip lasers are longitudinally pumped with the close-coupled, unfocused output of a diode laser.

BRIEF DESCRIPTION OF THE DRAWING

FIG. 8a depicts an array of microchip lasers on a wafer in association with a wafer of diode pump lasers; while

DESCRIPTION OF THE PREFERRED EMBODIMENT

Figure 1A:
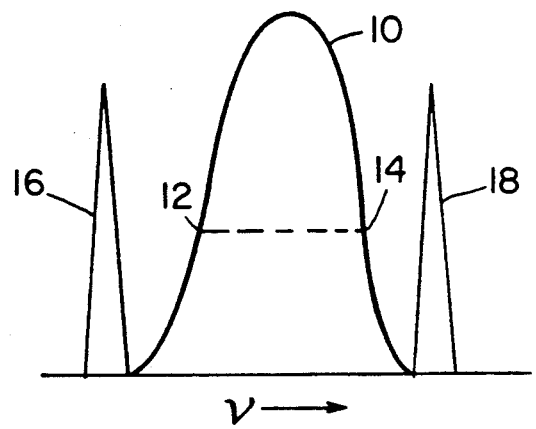
FIGS. 1a, and 1b, are graphs of laser gain and oscillation modes versus frequency.
Figure 1B:
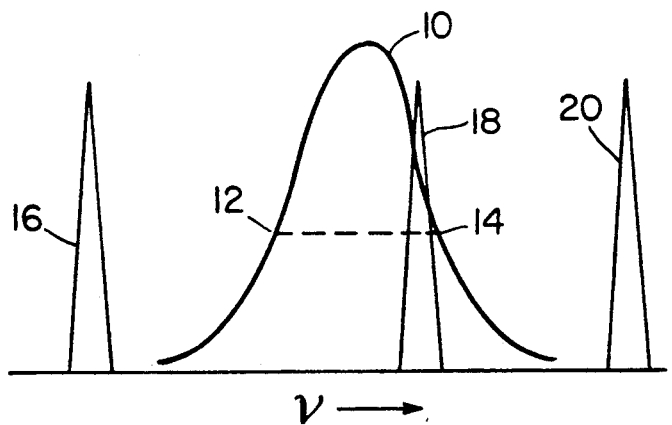

The theory on which the present invention is based will now be discussed in conjunction with FIG. 1. In FIG. 1a, a curve 10 is a plot of gain versus frequency for any solid-state laser gain medium such as Nd:YAG or Nd pentaphosphate. The gain bandwidth $\nu_g$ of the curve 10 is defined as the separation between arrows 12 and 14 wherein the gain exceeds the loss. Also shown in FIG. 1a are intracavity modes 16 and 18. The separation $\nu_c$ between adjacent cavity modes is given by the equation $\nu_c = c/2nl$ where c is the speed of light, n is the refractive index of a gain medium and l is the length of a resonant cavity. As shown in FIG. 1a, a cavity length l has been selected so that l is less than $c/2n\nu_g$ resulting in the intracavity modes 16 and 18 being spaced greater than the gain bandwidth of the curve 10 and the absolute frequency of the cavity mode $\nu_1 = mc/2nl$ where m is an integer such that the frequency falls outside the gain bandwidth. In the case illustrated the intracavity modes 16 and 18 straddle the gain curve 10 so that there will be no lasing of the gain medium since there is no overlap of the gain curve 10 with either of the modes 16 or 18. To insure that the gain medium will lase, it is necessary that there be at least some overlap of the gain curve 10 with one of the intracavity modes such as the mode 18 as shown in FIG. 1b. Assuring such overlap is accomplished by an appropriate choice of gain material and cavity length.

Figure 2A:
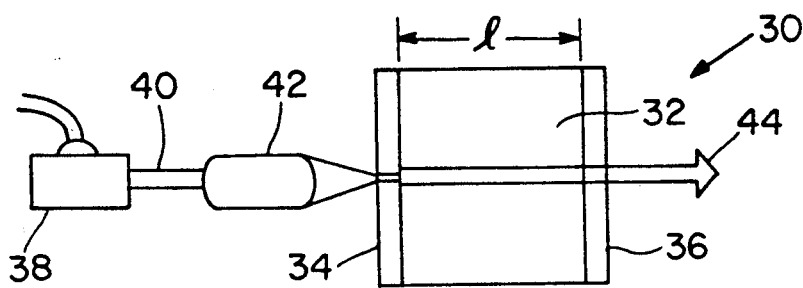
FIGS. 2a and 2b are cross-sectional views of a microchip laser of the invention.
Figure 2B:
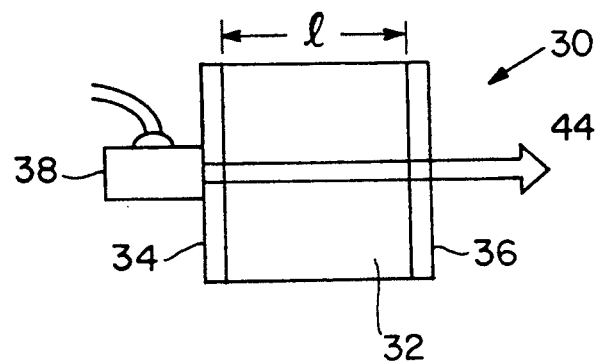

With reference now to FIG. 2a, a microchip laser 30 includes a solid-state gain medium 32 disposed between a pair of mirrors 34 and 36. The mirrors 34 and 36 are coated with multiple layers (20–30 layers) of dielectric material. The gain medium 32 is pumped optically by a laser 38 whose output light 40 is focused by a lens 42 onto the mirror 34. The mirror 34 transmits light from the pump laser 38 but reflects light generated within the gain medium 32. The length l of the gain medium 32 is selected so that $l \leq c/2n\nu_g$ where $\nu_g$ is the bandwidth of the gain medium. In this case, as pointed out above, a single mode only will oscillate within the gain medium 32 when $\nu_a$ falls within the gain bandwidth so that the output light 44 from the laser 30 is single frequency. The mirrors 34 and 36 may be separate elements bonded directly to the gain medium 32 or they may be multi-layer coatings deposited directly on the opposing flat surfaces of the gain medium 32. In FIG. 2b, the laser 38 is placed close to or bonded directly to the mirror 4 so that most of the light from the pump laser is absorbed in the fundamental mode region of the microchip laser.

To demonstrate the feasibility of diode pumped microchip lasers, several different microchip lasers were constructed and operated CW at room temperature. These included: Nd:YAG ($Nd_xY_{3-x}Al_5O_{12}$) at 1.06 μm using a 730-μm-long cavity; Nd:YAG at 1.3 μm using a 730-μm-long cavity; Nd pentaphosphate ($NdP_5O_{14}$) at 1.06 μm using a 100-μm long cavity; and Nd:GSGG ($Nd_xGd_{3-x}Sc_2Ga_3O_{12}$) at 1.06 μm using a 625-μm long cavity. In each case, single-longitudinal-mode, single-spatial-mode operation was achieved with pump powers many times above threshold.

The performance of the 1.06 μm Nd:YAG microchip lasers will now be discussed. These lasers were constructed from a slab of YAG with 1.1 wt. percent Nd doping. The slab was cut and polished to a thickness of 730 μm. Dielectric cavity mirrors were deposited directly onto the YAG. On other microchip lasers the mirrors were cut from 100-μm-thick wafer mirrors and then bonded to the Nd:YAG. The performance of the separate mirror devices was very similar to the performance of the dielectrically coated Nd:YAG cavities. The output mirror 36 had a reflectivity of 99.7% at 1.06 μm and was designed to reflect the pump laser. The opposite mirror 34 had a reflectivity of 99.9% at 1.06 μm and transmitted the pump. The Nd:YAG was cut into pieces 1 mm square (or less) and bonded to a sapphire heat sink (not shown). Damage to the dielectric coatings from cutting the wafers was confined to a distance of less than 30 μm from the edge of the chips.

A Ti:$Al_2O_3$ laser was used as a pump source to characterize the microchip lasers prior to diode pumping. It was tuned to the Nd:YAG absorption peak at 0.809 μm and focused onto the microchip laser, with an experimentally determined spot size of about 50 μm in the Nd:YAG crystal. Measurements showed that 18% of the incident pump power was reflected by the laser package and 27% was transmitted. The efficiency of the microchip lasers can be improved with better dielectric coatings.

Figure 3:
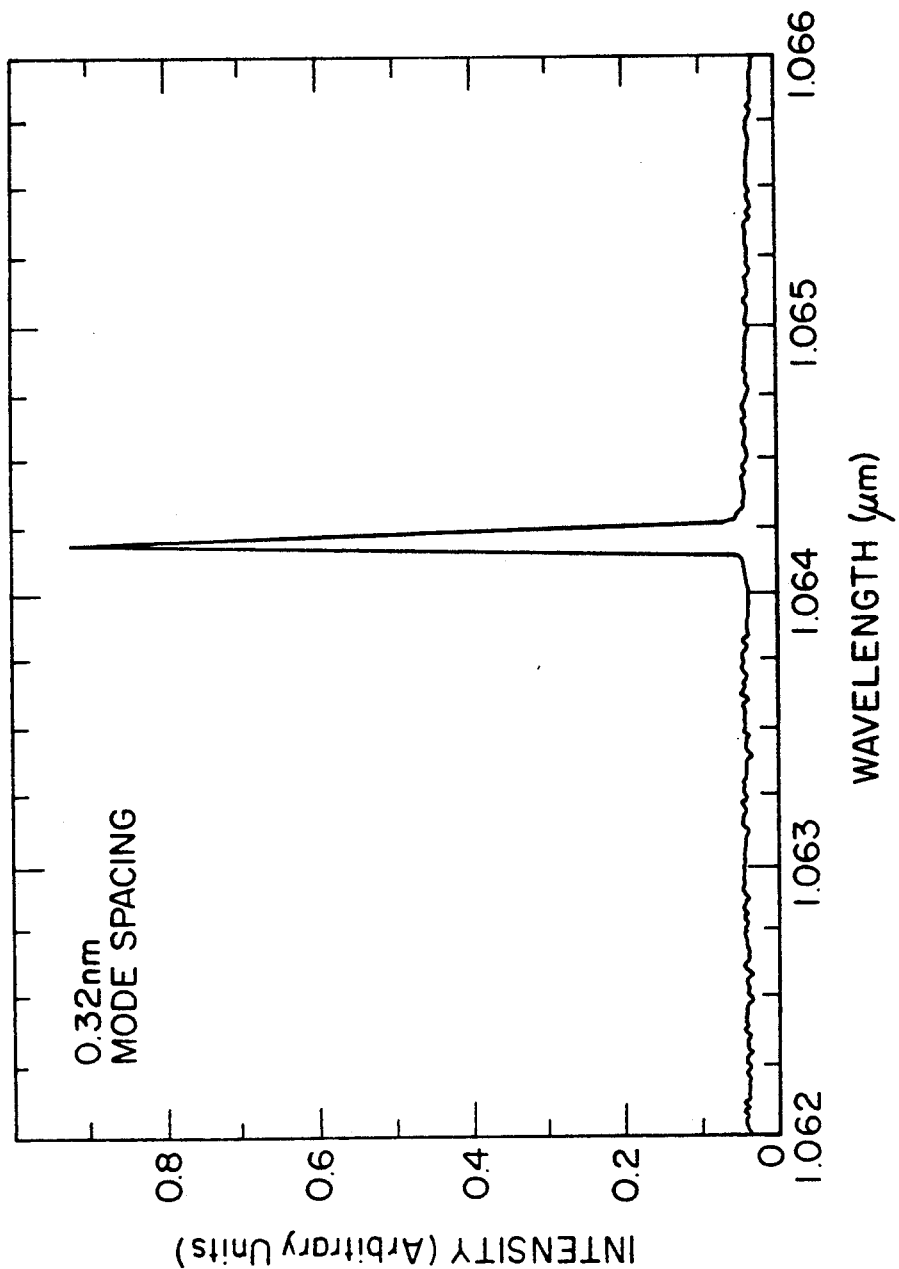
FIG. 3 is a graph of output intensity versus wavelength.

When the Nd:YAG microchip laser was properly aligned with the pump, single-longitudinal mode, single spatial-mode operation was observed. The output beam 22 was circularly symmetric with a divergence of about 20 mrad, determined by the spot size of the pump. Spectrometer traces (FIG. 3) showed only single-longitudinal mode operation for absorbed pump powers up to 40 mW. The lasing frequency tuned slightly as the pump spot on the microchip cavity was moved to positions with a slightly different cavity length. The devices constructed with wafer mirrors were continuously tunable over the entire gain spectrum by mechanical movement of the mirrors. In contrast to results reported in [7], the output polarization of the microchip laser was in the same direction as the polarization of the pump to better than 1 part in 100.

Figure 4:
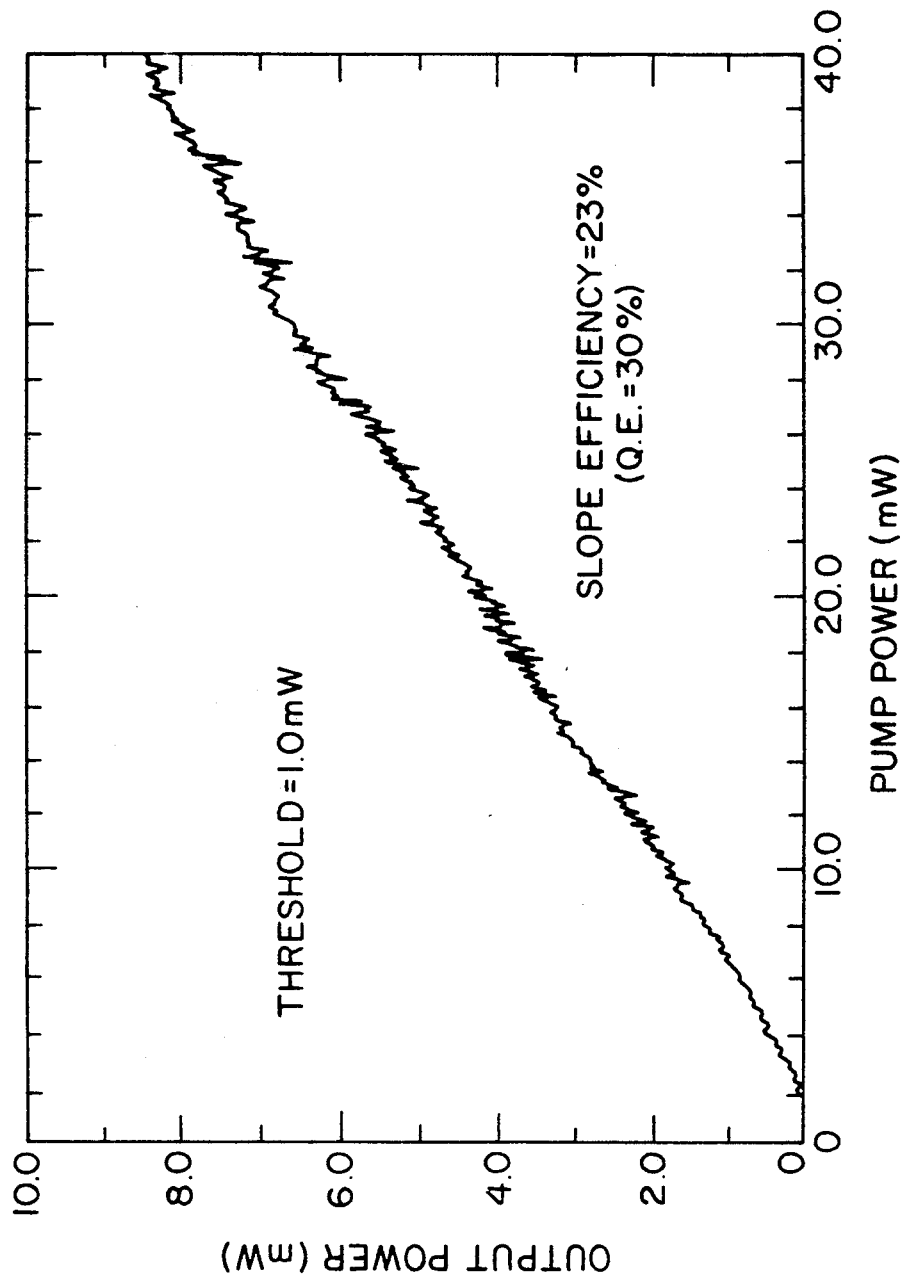
FIG. 4 is a graph of output power versus pump power for lasers of the invention.

A computer-controlled variable attenuator was introduced into the path of the pump beam to obtain the input-output power characteristics of the microchip laser. The lasing threshold was measured to be below 1 mW, and the slope quantum efficiency (determined from the output of the laser from the 99.7% reflecting mirror only) was slightly greater than 30%. The input-output curve is shown in FIG. 4. At higher pump powers thermal effects led to unrepeatable results. The highest single mode CW output power achieved with the microchip laser was 22 mW.

Figure 5A:
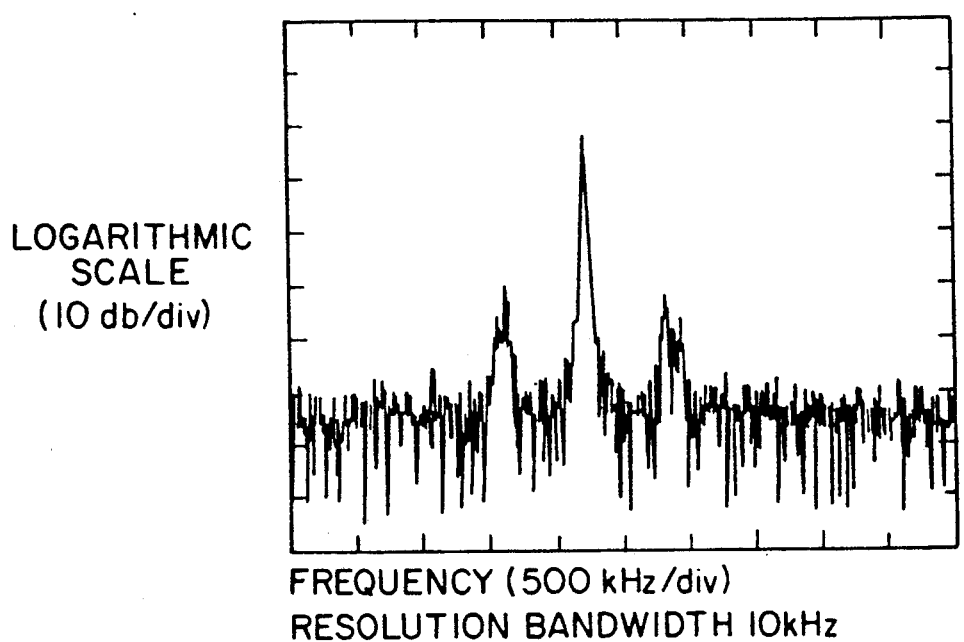
FIGS. 5a and 5b are graphs illustrating measured spectral response of the lasers of the invention.
Figure 5B:
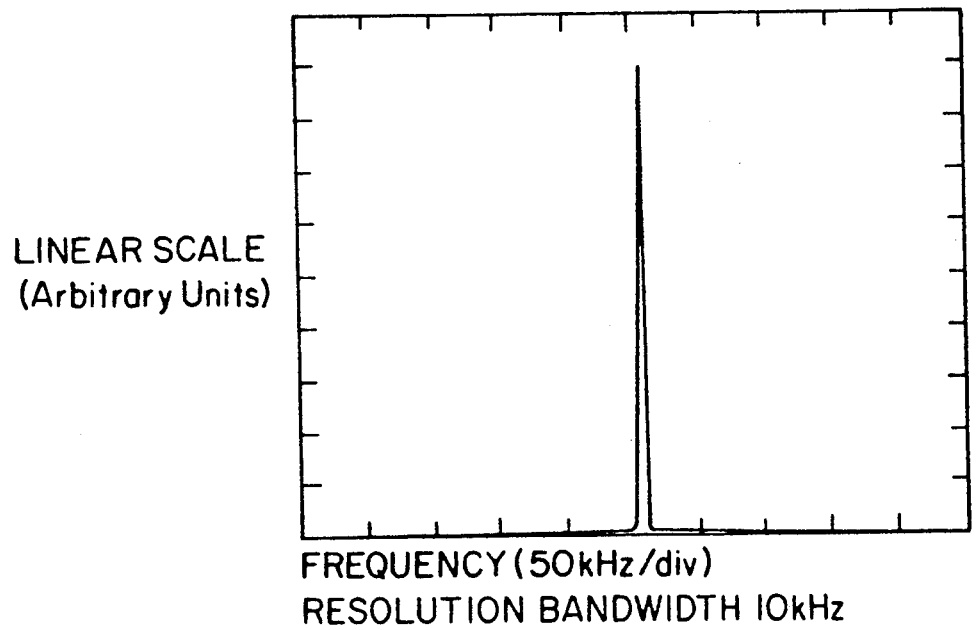

The linewidth of the Nd:YAG microchip lasers was measured by heterodyning two free running devices together. Thermal tuning was used in order to get the lasers to operate at nearly the same frequency. The outputs of the lasers were stable enough to obtain heterodyne measurements with a resolution of 10 kHz. At this resolution, the measured spectral response was instrument limited. (See FIG. 5) This gives a linewidth for the microchip lasers of less than 5 kHz, assuming equal contributions to the linewidth from each laser. The theoretical phase fluctuation linewidth is estimated to be only a few hertz. Relaxation oscillations account for the observed sidebands 700 kHz away from the main peak. The intensity of the sidebands varied with time, but was always greater than 30 dB below the main peak.

The microchip Nd:YAG lasers have been pumped with the unfocused output of a 20 mW GaAlAs diode laser. The Nd:YAG cavity was placed about 20 μm from the output facet of the diode laser and longitudinally pumped. The resulting pump spot size in the Nd:YAG was about 50 μm in diameter. The output of the microchip laser showed single-longitudinal-mode, fundamental (i.e. lowest order) single-spatial-mode operation at all available powers. The divergence of the laser was diffraction limited at about 20 mrad.

Figure 6A:
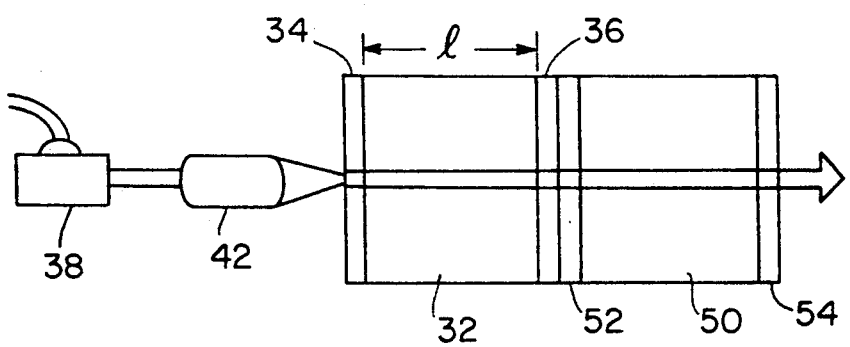
FIGS. 6a and 6b are cross-sectional views of an embodiment of the invention including a nonlinear optical element.

Important embodiments of the present invention are shown are FIG. 6. In FIG. 6a a dielectrically coated flat wafer 50 of a nonlinear optical material is located to receive light from the microchip laser 30. The wafer 50 includes dielectric coatings 52 and 54. The nonlinear optical material of the wafer 50 has the property that, when exposed to monochromatic light, it generates a beam of light including harmonics of the incident beam. Suitable nonlinear optical materials are, for example, MgO:LiNbO$_3$ and KTP (potassium titanyl phosphate). As in the embodiments of FIG. 2, the cavity length of the gain medium 32 satisfies the relationship $1 \leq c/2n\nu_g$. Light from the microchip laser 30 passes into the nonlinear optical element 50 which shifts the frequency to one of the harmonics of the incident beam. A particularly useful harmonic is the second harmonic. The optical coatings 52 and 54 are chosen such that they form a Fabry-Perot cavity at the pump wavelength. Typical reflectivities of such coatings at the pump wavelength are 98%. Mirror 52 is also highly reflective at the harmonic wavelength while mirror 54 is highly transmissive at the harmonic wavelength. In addition to techniques whereby the cavity frequency of the harmonic crystal is tuned to the laser frequency, the single-frequency microchip laser may be tuned to be resonant with any of the harmonic crystal cavity modes and may be locked to that frequency in any number of ways including monitoring of the intensity of the harmonic output power. The microchip laser may be continuously tuned by a number of techniques that are well known including the application of a longitudinal or transverse stress to the crystal or by modifying the refractive index of the crystal thermally.

Figure 9A:
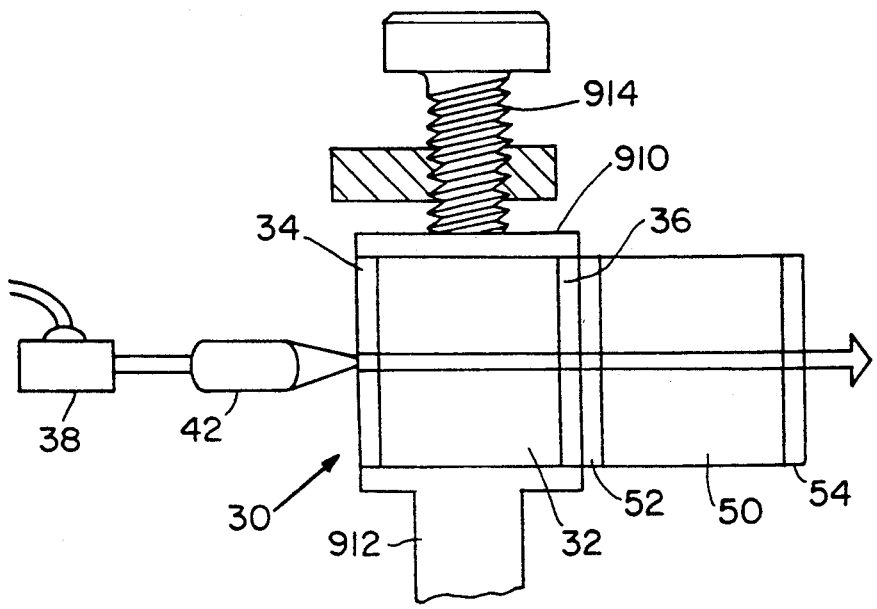
FIG. 9a depicts an embodiment of the microlaser of FIG. 6 with an apparatus for stress tuning and FIG. 9b depicts an embodiment of the microlaser of FIG. 6 with an apparatus for thermal tuning.

FIG. 9a shows a microlaser 30 associated with a nonlinear optical material 50 located within a Fabry-Perot cavity made up of mirrors 52 and 54. The gain medium 32 of the laser 30 is positioned between a fixed stop 912 and a movable stop 910 Pressure is applied (shown here as being applied by an adjustable screw 914) to the gain medium 32 through the movable stop 910. By adjusting the pressure on the gain medium 32, the frequency of the laser light can be matched to the resonant frequency of the Fabry-Perot cavity. In FIG. 9a a transverse stress is being applied to the medium. It is possible to stress tune the laser by the application of a longitudinal stress along the direction of the laser light.

Figure 9B:
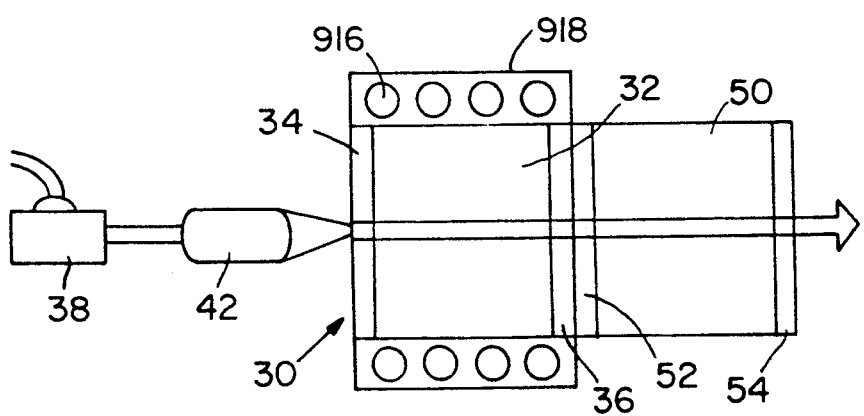

FIG. 9b shows a microlaser 30 associated with a nonlinear optical material 50 as in FIG. 9a. However, in this embodiment the gain material 32 is positioned within a temperature regulating jacket 918 which can be heated or cooled by the temperature regulating elements 916. By adjusting the temperature of the gain medium 32 the frequency of the laser light can be thermally tuned to match the resonant frequency of the Fabry-Perot cavity. Because the laser frequency can be changed by thermal tuning, it should also be noted that in order to stress tune a microlaser and have it remain tuned, it may be necessary to regulate the temperature of the gain medium.

The ability to continuously tune the microchip laser over its gain bandwidth without a mode jump is a significant advantage in being able to precisely tune and lock to any of the Fabry-Perot cavity modes of the harmonic crystal.

The harmonic crystal with its resonant cavity may be separate from the microchip laser or it may be bonded directly to the output end of the microchip laser using an optically transparent cement. The use of flat-flat cavities on the harmonic crystal simplify the fabrication process by using similar wafer processing technology as that for the microchip laser. However, any of the well known techniques for a resonant harmonic cavity may also be used in conjunction with the microchip laser such as the unidirectional ring resonator or spherical mirror cavity. Further, the nonlinear material may be incorporated within the laser cavity itself.

Figure 6B:
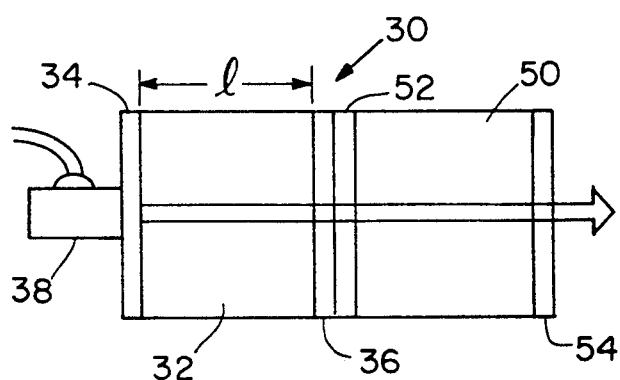
Figure 7:
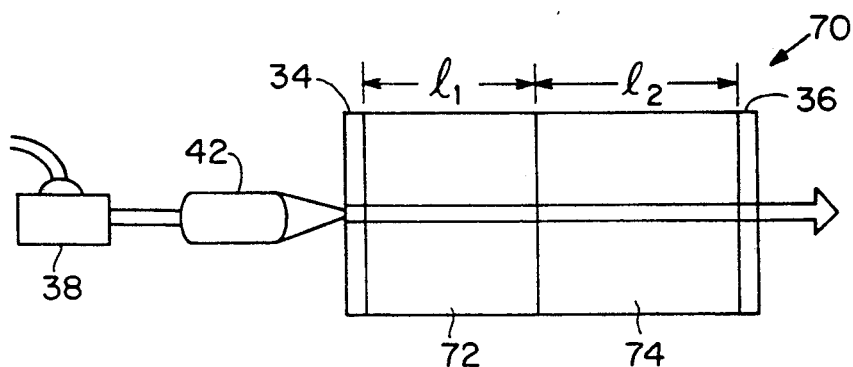
FIG. 7 is a cross-sectional view of an embodiment of the invention with a nonlinear optical element incorporated within the laser resonant cavity.

FIG. 6(b) shows a configuration similar to FIG. 6(a) but with the diode placed close to or bonded to the laser medium. FIG. 7 is an embodiment of the invention in which nonlinear optical material forms a part of the laser cavity structure. A microchip laser 70 includes a flat wafer 72 of an active gain medium. A nonlinear optical element 74 is bonded to the gain medium 72. Dielectric mirrors 34 and 36 complete the microchip laser 70. The length l between the mirrors 34 and 36 satisfies the relationships $$\nu_g \leq c/2(n_1 l_1 + n_2 l_2)$$

$$l = l_1 + l_2$$

Where $l_1$, $n_1$ are the length and index of refraction respectively of the gain medium and $l_2$, $n_2$ are the length and index of refraction of the non-linear material It will be appreciated by those skilled in the art that by selection of the appropriate nonlinear optical material, the output from the harmonically converted microchip laser can be in the visible or ultraviolet region and be useful for read and write optical disks or projection television applications. It will also be appreciated that using the same fabrication techniques, an electro optic or acousto optic modulator can be incorporated into the composite structure with the modulator electrodes being photolithographically incorporated onto the wafers before being diced up. Such fabrication techniques would greatly reduce the cost and complexity of such devices over those using discrete optical components that are fabricated and assembled separately.

In addition to harmonic generation by means of a suitable nonlinear material, nonlinear frequency conversion may be carried out in suitable nonlinear optical materials using optical parametric oscillation or amplification as well as frequency sum or difference mixing using the single frequency microchip laser. Similar cavity fabrication as that described above may be used to create a microchip laser whose single frequency light is frequency converted by parametric conversion into light of two lower frequencies. In this parametric conversion microchip laser, the resonators differ from those previously described only in that the nonlinear optical material is a parametric conversion material such as LiNbO$_3$ or KNbO$_3$ and the cavity coating are chosen according to the well known art form for such devices.

Fabrication of the foregoing embodiments will now be discussed. A boule of laser material is grown by conventional methods. The boule is sliced to the appropriate thickness depending on whether or not a nonlinear optical element is to be incorporated into the resonant cavity. The resulting wafer is lapped to the desired length, parallel and flat to better than one wavelength using conventional lapping techniques. The wafer must be flat over the area being irradiated by the diode pump laser.

At this point, the gain medium is coated with multiple layers of dielectric material on opposite faces. Alternatively, separate mirrors are bonded to the gain medium. The slice or wafer is then diced into individual microchip lasers which can be mounted to the pump optics.

The nonlinear optical elements used for frequency shifting are lapped flat and parallel and incorporated either within or outside of the laser cavity as shown in FIGS. 6 and 7. In the case in which the nonlinear optical material is outside the resonant cavity, both surfaces of the nonlinear material are coated with dielectric layers which are highly reflective to the frequency of light generated by the microchip laser. In addition, the surface of the nonlinear optical material nearest to the microchip laser is coated with dielectric layers which are highly reflective of the wavelength of light generated by the nonlinear optical material. Although for ease of manufacture, the nonlinear element may be lapped with both surfaces flat, it is also possible, in the case of the optical material being outside the laser cavity, to have the surface away from the microchip laser be a nonflat surface.

Any non-parallel resonator structure known to the art of resonators may be used with the microchip laser. In fact, the use of the microchip laser makes such resonator design easier, since the laser can be tuned to the cavity frequency.

If a nonlinear optical element is to be part of the resonant cavity, the boule of gain medium is sliced and lapped flat and parallel. The nonlinear optical material is also lapped flat and parallel and bonded to the gain medium using transparent optical cement. The lengths of the gain material and the nonlinear optical material satisfy the relationship discussed above. After the gain medium and nonlinear optical material are bound, mirrors are applied to the other surfaces either as multilayer dielectric coatings on the material itself or as separate mirrors, and the wafers are diced into chips.

Figure 8A:
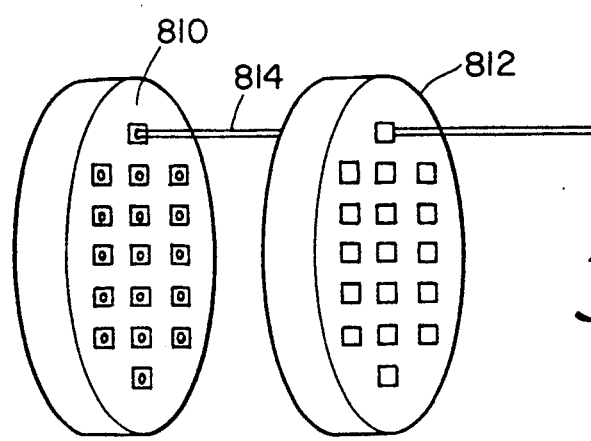
Figure 8B:
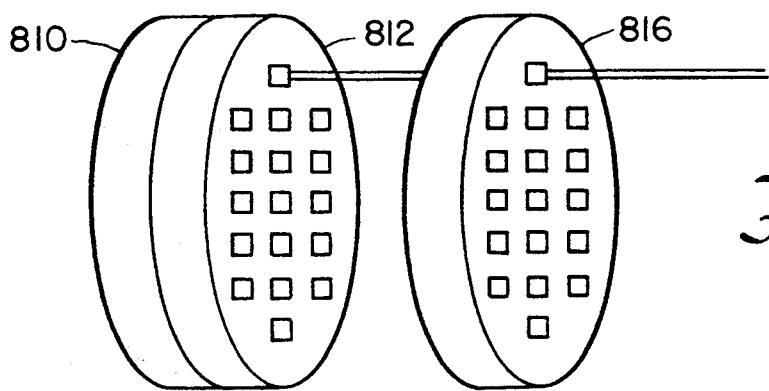
FIG. 8b depicts the array of FIG. 8a in association with a wafer of nonlinear optical material with Fabry-Perot resonantors.

It should be noted that one can construct a microchip laser array or a microchip laser nonlinear frequency converter array by simply not dicing the wafers. That is, by leaving the microchip laser in wafer form, and associating the microchip laser wafer with a two dimensional diode laser array to pump the microchip laser array, a two dimensional array of microchip lasers is immediately formed. Referring to FIG. 8a, a two dimensional array of microchip lasers consists of an array of laser diodes 810 associated with a microchip laser wafer 812. Light from the laser didoes 814 excites the microchip laser to emit light. The two wafers can be cemented together using optically transparent cement. If the microchip laser wafer also contains the nonlinear optical material within its resonant cavity, frequency conversion using a two wafer system is possible. If, however, the nonlinear optical material is not on the microchip laser, an array can still be constructed by simply placing the wafer with the nonlinear optical material and Fabry-Perot resonant cavity 816 in association with the other wafers. Such a configuration is shown in FIG. 8b. The resonant frequency of the nonlinear optical material cavity must be matched to the microchip frequency in the manner described above.

A microchip laser array is particularly useful if a directed laser beam is required. By properly modulating the phase of each microchip laser using, for example, individually addressable phase modulators placed in the output beam or within the cavity of each microchip laser, it is possible to phase steer the array and thereby direct the beam. The output of the two-dimensional array of single-frequency microchip lasers may be coherently combined into a single beam using well known techniques of binary optics.

The diode-pumped microchip lasers according to the invention exhibit low pump threshold, high efficiency, and single frequency operation. These lasers can be continuously tuned across their gain-bandwidth in a single frequency using a transversely or longitudinally applied stress to the microchip laser crystal. The microchip laser is applicable, for example, to frequency converters, modulators and Q-switches, with photolithographically deposited electrodes It results in low cost, volume-producible lasers and electro-optic devices. The incorporation of nonlinear optical material, either inside or outside of the cavity, generates other wavelengths of light. The output from such a device, in the visible or ultraviolet region, is useful for read and write optical disks and projection television applications.

REFERENCES

1. For a complete review of diode pumped solid-state lasers see T. Y. Fan and R. L. Byer, IEEE J. Quantum Electron. 6, 895 (1988).
2. T. J. Kane, A. C. Nilsson, and R. L. Byer, Opt. Lett. 12, 175 (1987).
3. B. Zhou, T. J Kane, G. J. Dixen, and R. L. Byer, Opt Lett 10, 62 (1985).
4. A. Owyoung, G. R. Hadley, P. Esherick, R. L. Schmit, and L. A. Rahn, Opt. Lett. 10, 484 (1985).
5. K. Kubodera and J. Noda, Appl. Opt. 12, 3466 (1982).
6. G. Winter, P. G. Mockel, R. Oberbacher, and L. Vité, Appl. Phys. 11, 121 (1976).
7. P. Esherick and A. Owyoung, Technical Digest, Conference on Lasers and Electrooptics (Optical Society of America, Washington, D.C., 1988), paper THB2.

What is claimed is:

1. A method of making a microchip laser with a nonlinear optical material laser light frequency converter comprising the steps of:
    growing a boule of laser gain material;
    slicing the boule of laser gain material into a wafer;
    lapping the gain wafer flat and parallel and to a thickness l wherein l satisfies the relationship
    $l = c/2n\nu_g$ wherein n is the index of refraction for the gain material, and $\nu_g$ is the bandwidth of the gain material;
    applying mirrors to the gain material wafer so as to form a resonant cavity;
    dicing the gain material with resonant cavity wafer into microchips;
    associating the microchip with a pumping laser so as to allow the laser light to enter the gain material through the face of the resonant cavity;
    growing a boule of nonlinear optical material;
    slicing the boule of nonlinear optical material into a wafer;
    forming a Fabry-Perot resonant cavity upon said nonlinear optical material wafer;
    dicing the nonlinear optical material wafer with Fabry-Perot resonant cavity into chips; and
    associating a nonlinear optical material chip with a microchip such that light emitted from the microchip upon stimulation by said pumping laser impinges upon the nonlinear optical material chip through a face of the Fabry-Perot resonant cavity.

2. A method of making a microchip laser with a nonlinear optical material laser light frequency converter comprising the steps of:
    growing a boule of laser gain material;
    growing a boule of nonlinear optical material;
    slicing the boule of laser gain material into a wafer;
    slicing the boule of nonlinear optical material into a wafer;
    lapping the wafer of laser gain material and the wafer of nonlinear optical material parallel and flat to thicknesses $l_1$ and $l_2$, respectively, such that the thicknesses satisfy the relationship:

$$v_g c/2(n_1 l_1 + n_2 l_2),$$

wherein $n_1$ is the refractive index of the gain medium, $n_2$ is the refractive index of the nonlinear optical material and $v_g$ is the bandwidth of the gain medium;

bonding the wafer of gain material to the wafer of nonlinear optical material using transparent optical cement;

applying a mirror to each free face of the bonded wafers so as to form a resonant cavity;

dicing the combined wafer and resonant cavity into microchips, and associating a microchip with resonant cavity with a pumping laser such that light from the pumping laser enters the resonant cavity through the face of the resonator associated with the gain medium.

3. A method of generating a single frequency, single longitudinal mode of light oscillation comprising:
  a) disposing a solid state gain medium between two mirrors forming a cavity in which the distance $l_1$ between the mirrors is selected such that the gain bandwidth of the gain medium is less than or equal to the frequency separation of the cavity modes of propagation and further wherein 1, satisfied the following: $1 \leq c/2nv_g$ where c is the speed of light, n is the refractive index in the gain medium, and $v_g$ is the gain bandwidth of the gain medium and one cavity mode frequency falls within the gain bandwidth of the gain medium to produce such single frequency single longitudinal mode of light oscillation from said medium; and
  b) pumping the gain medium with light.

4. The method of claim 3 wherein the mirrors are formed by depositing coating on opposing surfaces of the gain medium.

5. The method of claim 3 wherein the mirrors are bonded to opposing surfaces of the gain medium.

6. The medium of claim 3 wherein the gain medium is Nd:YAG.

7. The method of claim 3 wherein the gain medium is Nd pentaphosphate.

8. The method of claim 3 wherein the gain medium is Nd:YAG and the separation between mirrors is in the range of several hundred μm.

9. The method of claim 3 wherein the gain medium is Nd pentaphosphate and the separation between the mirrors is in the range of 10–100 μ'm.

10. The method of claim 3 wherein semiconductor diode lasers are used to optically pump the gain medium.

11. The method of claim 10 wherein the semiconductor diode laser is bonded to one of the mirrors.

12. The method of claim 3 wherein the gain medium and mirrors form a Fabry-Perot type resonator at the frequency at which the medium is optically pumped.

13. The method of claim 4 wherein the coatings have high reflectivity at the wavelength at which the gain medium is optically pumped.

14. The method of claim 10 wherein the mirrors include dielectric coatings having high reflectivity at the semiconductor diode pump laser frequency.

15. A method of generating light at a single frequency and longitudinal mode of oscillation comprising the steps of:
  a) disposing a solid state gain medium between two mirrors to form an optical cavity the distance $l_1$ between the mirrors being selected so that the gain bandwidth of the gain medium is less than or substantially equal to the frequency separation of modes of light propagated in said cavity by stimulated emission of light and such that one cavity mode frequency falls within the gain bandwidth of the medium;
  b) pumping said medium with light to stimulate emission of light from said medium which emission from said medium is at a single frequency and single longitudinal mode of oscillation; and
  c) disposing nonlinear optical material to receive light from the gain medium, the nonlinear optical material selected to generate harmonics of the light from the gain medium and wherein the length of the gain medium and the length of the nonlinear material satisfies the relationship $$v_g \leq c/2(n_1 l_1 + n_2 l_2)$$

wherein $n_1$ and $l_1$ are the refractive index and length, respectively, of the gain medium, $n_2$ and $l_2$ are the refractive index and length, respectively, of the nonlinear optical material, and $v_g$ is the bandwidth of the gain material.

16. The method of claim 15 wherein the non-linear material generates lower harmonics.

17. The method of claim 15 wherein the non-linear material generates higher harmonics.

18. The method of claim 15 further comprising the step of:
  applying a longitudinal stress to said gain medium to thereby tune a frequency of the light.

19. The method of claim 15 further comprising the step of:
  applying a transverse stress to said gain medium to thereby tune a frequency of the light.

20. The method of claim 15 further comprising changing the temperature of said gain medium to thereby tune a frequency of the light.

21. The method of claim 20 wherein the nonlinear optical material is contained within a resonator with planar parallel faces.

22. The method of claim 15 wherein the nonlinear optical material is disposed within a resonator having a flat face disposed toward the gain medium and a spherical face disposed away from the gain medium.

23. The method of claim 15 in which the gain medium is Nd:YAG.

24. The method of claim 23 in which the distance between the mirrors is about 730 μm.

25. The method of claim 15 in which the gain medium is Nd pentaphosphate.

26. The method of claim 25 in which the distance between the mirrors is about 100 μm.

27. The method of claim 15 in which the gain medium is Nd:GSGG.

28. The method of claim 27 in which the distance between the mirrors is about 625 μm.

29. The method of claim 15 in which the mirrors are formed of multiple layers of dielectric.

30. The method of claim 15 in which the nonlinear material is MgO:LiNbO$_3$.

31. The method of claim 15 in which the nonlinear material is KTP.

32. A method of forming an array of lasers comprising the steps of:
   a) disposing a body of solid state gain material between two mirrors to form an optical cavity, the thickness of the body selected so that the gain bandwidth of the gain medium is less than or substantially equal to the frequency separation of the modes of propagation of light in the cavity and such that at least one cavity mode frequency falls within the gain bandwidth of the medium; and
   b) disposing an array of lasers adjacent and aligned with the body so as to stimulate said gain medium into light emission.

33. The method of claim 32 further comprising the steps of disposing a body of nonlinear optical material between two mirrors to form a Fabry-Perot resonator with a resonant frequency coincident with the mode of oscillation of the gain medium and locating said resonator so as to be irradiated by said light emission and thereby stimulated into optical frequency conversion.

* * * * *

UNITED STATES PATENT AND TRADEMARK OFFICE
CERTIFICATE OF CORRECTION

PATENT NO. : 5,256,164
DATED : Oct. 26, 1993
INVENTOR(S) : Aram Mooradian

It is certified that error appears in the above-identified patent and that said Letters Patent is hereby corrected as shown below:

Col. 1, lines 16 and 17, delete "This application is a continuation-in-part of U.S. Ser. No. 151,396 filed Feb. 2, 1988."

Col. 8, line 38, delete "$1=c/2n\nu_g$" and insert --$\ell \leq c/2n\nu_g$--.

Col. 9, line 5, delete "$\nu_g c/2(n_1\ell_1+n_2 2)$" and insert --$\nu_g \leq c/2(n_1\ell_1+n_2\ell_2)$--.

Signed and Sealed this

Third Day of May, 1994

Attest:

BRUCE LEHMAN

Attesting Officer

Commissioner of Patents and Trademarks